Feb. 10, 1959     W. B. ROBERTS     2,873,414
SELENIUM RECTIFIER
Filed June 16, 1955
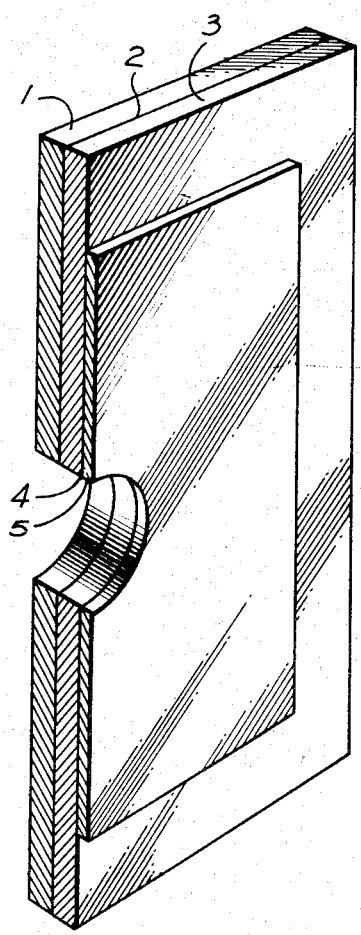
INVENTOR
WILLIAM B. ROBERTS
By
Attorneys.

United States Patent Office 2,873,414
Patented Feb. 10, 1959

2,873,414

SELENIUM RECTIFIER

William B. Roberts, Bloomington, Ind., assignor to Sarkes Tarzian, Inc., Bloomington, Ind., a corporation of Indiana Application June 16, 1955, Serial No. 515,945

7 Claims. (Cl. 317—241)

This invention relates to an improved selenium rectifier and to methods of producing the same. More particularly, the invention relates to a selenium rectifier having a novel barrier layer between the selenium and the counter electrode. More specifically, the invention pertains to selenium rectifiers wherein the artificial barrier layer between the selenium layer and the counter electrode is produced by the action of a solution containing urea, an aldehyde and a basic nitrogen compound.

It is generally believed that the effective rectifying action of dry rectifiers such as selenium rectifiers, depends largely upon the formation of a barrier layer between the layer of selenium and the counter electrode. This barrier layer is strengthened during the forming of the rectifier, which comprises applying voltage to the rectifier in the reverse or poorly conducting direction. It has been found that the effective rectifying action of selenium rectifiers can be improved by interposing an artificial barrier layer between the selenium and the counter electrode. In the past, this artificial barrier layer has been made of shellac, nitrocellulose, nylon, or similar film-forming organic materials.

It is the object of the present invention to provide a selenium rectifier with a novel barrier layer having improved forward and reverse characteristics. It is a further object of this invention to provide a method for producing such barrier layers in selenium rectifiers. Another object of the invention is to produce such barrier layers from the combination of urea, an aldehyde, and a basic nitrogen compound. These and other objects of the invention will be apparent from the following disclosure.

The invention is more readily understood by reference to the following description taken in conjunction with the accompanying single-figure drawing which shows a cross-section of a rectifier cell. The base plate 1, which may be formed of aluminum or iron, is coated with a layer of nickel 2 by electroplating or other suitable deposition method. A layer of selenium 3 is deposited on the nickel-plated base plate under heat and pressure and suitably heat-treated to form metallic selenium. On the layer of selenium, a barrier layer 4 is developed in accordance with the present disclosure, and then on top of the barrier layer 4 a counter electrode 5 is produced.

The production or formation of the barrier layer is accomplished by coating the selenium layer with a thin layer of a dilute solution of urea and an aldehyde such as formaldehyde in a volatile organic solvent such as methanol, ethanol, or propanol, allowing the organic solvent to evaporate, leaving a residue of urea, aldehyde and other nonvolatile organic materials on the surface of the selenium, and finally applying to the selenium layer a thin layer of the counter electrode. The finished rectifier cell is then electroformed by passing a relatively high current through the rectifier cell in reverse direction. The preferred method of electroforming the rectifier is that disclosed in the application of George Eannarino, Serial No. 475,705, filed December 16, 1954. The forming of the cell may be conducted at low temperature or at high temperature, or both, depending upon the properties desired in the rectifier.

The counter electrode may be formed of any of the metals or alloys conventionally used in selenium rectifiers. See, for example, the article by Roberts in Journal of the Electrochemical Society, vol. 97, September 1950, entitled "Counterelectrodes for Selenium Rectifiers." The counter electrode may be of metals such as bismuth, cadmium, tin or lead, or of low-melting alloys containing such metals in combination with other metals such as copper, antimony, nickel, beryllium, zinc, gold, silver, manganese, aluminum and magnesium. The counter electrode can be applied by molten metal spraying, vacuum evaporation, cathodic sputtering, mechanical pressing or electrodeposition, the first method being preferred for low-melting alloys such as bismuth-cadmium or bismuth-lead-cadmium eutectics.

The solution of urea, aldehyde, and basic nitrogen compound which is used to coat the selenium layer during the formation of the barrier layer, generally contains 3% or less of nonvolatile material, that is, urea, aldehyde, and amine, in volatile organic solvents. The pH of the solution is adjusted to 6.5 to 7.5, and preferably to 6.8 to 7.2, by addition of a basic nitrogen compound such as ammonia, pyrrolidine, ethylenediamine, tetramethylenediamine, N,N,N',N'-tetrakis(2-hydroxypropyl)ethylenediamine, 3-diethylaminopropylamine, 3-dimethylaminopropylamine, 3,3 - iminobispropylamine, triethanolamine, pyridine, phenylenediamine, p-nitroaniline, and similar basic nitrogen compounds. The solution generally contains small amounts of water in the order of 1 to 10% by volume in order to aid in the interaction of the chemicals of the barrier layer with each other and with the selenium layer and the counter electrode.

Formaldehyde is the preferred aldehyde for use in this invention, by virtue of its low cost and availability. It can be employed as formalin solution, as paraformaldehyde or as trioxymethylene. Other aldehydes such as acetaldehyde and propionaldehyde, as well as metaldehyde, furfural and benzaldehyde, can be used. Besides urea, analogs of urea such as thiourea, can be used. The solutions of urea and aldehyde which are used to coat the selenium layer generally contain 2 to 5 moles of aldehyde per mole of urea. At least 2 moles of aldehyde are used because 2 moles of aldehyde condense with 1 mole of urea in forming an organic resinous material. Excesses of aldehyde are generally preferred, although they are not necessary for the successful operation of the invention.

The following examples disclose coating formulations which may be applied to the selenium layer for the formation of effective barrier layers. While these examples disclose specific materials and conditions, it is to be understood that they are provided by way of illustration only and are not a limitation of the scope of the invention. After the selenium layers of the rectifier cells are treated with the coating formulations set forth in the examples, the selenium layers are coated with a counter electrode, generally in the form of a cadmium-bismuth alloy to a thickness of 0.001 centimeter or less. These cells are then electroformed by applying a direct current of relatively high current density in the range of 1 to 7 amperes per square inch in the reverse direction, to the cells in either oil solution or air. Rectifier cells produced in accordance with the following examples exhibit a relatively long life and high stability, particularly against high temperatures and humidity. Stacks of six cells in series are assembled and tested as to forward and reverse characteristics. All of the rectifiers produced in accordance with the following examples exhibited forward conductance characteristics of at least 260 milliammeters at 8.4 volts D. C. and reverse conductance characteristics of no more than 18 milliammeters at 112 volts D. C.

*Example 1*

A solution of 3 cc. of nitromethane and 4 cc. of an aqueous solution containing 61% by weight of formaldehyde and 24% by weight of urea in 150 cc. of 95% ethanol is adjusted to pH 6.9 with pyrrolidine. The resulting clear solution is applied directly to selenium layers of rectifiers by dropping a small quantity of the solution on the spinning rectifier. The solution is spread uniformly over the selenium surface by centrifugal force and the excess is thrown off. In this way, a thin uniform layer of the solution is applied to the entire selenium layer. The rectifier cell is completed and electroformed as disclosed above.

*Example 2*

To 150 cc. of 95% ethanol are added 4 cc. of an aqueous solution containing 61% by weight of formaldehyde and 24% by weight of urea. To the urea-formaldehyde-ethanol solution is added 3 cc. of nitromethane. A small amount of 28% aqueous ammonia solution is added to adjust the pH to 6.9. The resulting solution is applied directly to the selenium layer of the rectifier by spinning and the rectifier is completed and electroformed in the usual manner.

*Example 3*

Another coating solution is produced by dissolving in 150 cc. of methanol 4 cc. of a solution containing 61% of urea and 24% of formaldehyde in water. 3 cc. of nitromethane are then added, and sufficient 3-diethylaminopropylamine to bring the pH to 6.9. The resulting solution is applied directly to the selenium layer of the rectifier by spinning and the rectifier is completed and electroformed in the usual manner.

*Example 4*

Another coating solution is produced by dissolving in 150 cc. of methanol 4 cc. of a solution containing 61% of urea and 24% of formaldehyde in water. 3 cc. of nitromethane are then added, and sufficient 3,3-iminobispropylamine to bring the pH to 6.9. The resulting solution is applied directly to the selenium layer of the rectifier by spinning and the rectifier is completed and electroformed in the usual manner.

*Example 5*

Suitable coating solution is produced by dissolving 3 cc. of nitromethane in 150 cc. of ethanol, and adding to the resulting solution 5 cc. of a solution containing 30% of formaldehyde and 24% urea dissolved in water. The pH of the resulting solution is adjusted to 7 with aqueous ammonia.

*Example 6*

A coating solution for selenium is produced by dissolving in 150 cc. of ethanol 3 cc. of nitromethane, 1 cc. of furfuryl alcohol, and 5 cc. of distilled water. To the resulting solution are added 4 cc. of a solution containing 61% of urea and 24% of formaldehyde in water. The pH of the resulting solution is adjusted to 6.9 with ammonia water.

*Example 7*

A coating lacquer is produced by dissolving 3 cc. of nitromethane in 150 cc. of 95% ethanol. To the resulting solution are added 4 cc. of a urea-formaldehyde solution containing 59% of formaldehyde and 26% of urea in water. The pH of the resulting solution is brought to 7.0 by the addition of ethylenediamine. The resulting solution may be applied directly to selenium rectifier surfaces.

*Example 8*

To 100 cc. of isopropanol are added 2 cc. of nitromethane, followed by 2 cc. of 50% formalin solution and 0.5 gram of crystalline urea. The mixture is agitated until solution has occurred, and then adjusted to a pH of 6.9 by the addition of triethanolamine. The resulting solution may be used directly on selenium layers.

*Example 9*

To 150 cc. of ethanol containing 2 cc. of benzyl alcohol and 2 cc. of furfuryl alcohol are added 1 cc. of 37% formalin solution and 0.5 gram of crystalline urea. The resulting mixture is stirred until the solution is complete. Then sufficient N,N,N′,N′-tetrakis(2-hydroxypropyl)ethylenediamine is added to bring the pH to 7.2. The resulting solution is then applied directly to the selenium layer.

*Example 10*

To 150 cc. of 95% ethanol are added 3 cc. of acetaldehyde and 1 gram of urea, followed by 3 cc. of nitromethane. The pH of the clear solution is brought to 7.0 by the addition of tetramethylenediamine.

*Example 11*

To 150 cc. of 95% ethanol are added 4 cc. of an aqueous solution containing 60% by weight of formaldehyde and 25% by weight of urea, followed by 3 cc. of nitroethane and sufficient pyridine to adjust the pH to 6.9. The clear solution thus obtained is applied to the selenium layers of a group of cells. The cells are completed and electroformed as described above.

What is described as new and desired to be secured by Letters Patent of the United States is:

1. A rectifier comprising a base plate, a layer of selenium on said base plate, a barrier layer on said selenium layer formed by coating the selenium layer with a solution containing a urea and an aldehyde in an aqueous volatile organic solvent at a pH in the range of 6.5 to 7.5, and a counter electrode layer on said barrier layer.

2. A rectifier comprising a base plate, a layer of selenium on said base plate, a barrier layer on said selenium layer formed by coating the selenium layer with a solution containing urea, an aldehyde and a basic nitrogen compound in an aqueous volatile organic solvent at a pH in the range of 6.5 to 7.5, and a counter electrode layer on said barrier layer.

3. A rectifier comprising a base plate, a layer of selenium on said base plate, a barrier layer on said selenium layer formed by coating the selenium layer with a solution containing urea, formaldehyde and a basic nitrogen compound in an aqueous lower alcohol solvent at a pH in the range of 6.5 to 7.5, and a counter electrode layer on said barrier layer.

4. A rectifier comprising a base plate, a layer of selenium on said base plate, a barrier layer on said selenium layer formed by coating the selenium layer with a solution containing urea, formaldehyde and ammonia in an aqueous lower alcohol solvent at a pH in the range of 6.5 to 7.5, and a counter electrode layer on said barrier layer.

5. A rectifier comprising a base plate, a layer of selenium on said base plate, a barrier layer on said selenium layer formed by coating the selenium layer with a solution containing urea, formaldehyde and hexamethylenediamine in an aqueous lower alcohol solvent at a pH in the range of 6.5 to 7.5, and a counter electrode layer on said barrier layer.

6. A rectifier comprising an aluminum base plate, a layer of selenium on said base plate, a barrier layer on said selenium layer formed by coating the selenium layer with a dilute solution of urea, formaldehyde and hexamethylenediamine in an aqueous lower alcohol solvent at a pH of 6.5 to 7.5, and a counter electrode layer containing cadmium on said barrier layer.

7. A rectifier comprising an aluminum base plate, a layer of selenium on said base plate, a barrier layer on said selenium layer formed by coating the selenium layer with a dilute solution of urea, formaldehyde and hexamethylenediamine in an aqueous lower alcohol solvent at a pH of 6.5 to 7.5, and a counter electrode layer containing cadmium on said barrier layer, and wherein the relative amount of formaldehyde to urea is in excess of 2 moles of formaldehyde to 1 mole of urea.

References Cited in the file of this patent

UNITED STATES PATENTS

| | | |
|---|---|---|
| 2,139,731 | De Boer et al. | Dec. 13, 1938 |
| 2,476,989 | Martinet et al. | July 26, 1949 |
| 2,481,739 | Goodman | Sept. 13, 1949 |
| 2,510,361 | Addink | June 6, 1950 |
| 2,660,698 | Black | Nov. 24, 1953 |

FOREIGN PATENTS

| | | |
|---|---|---|
| 646,852 | Great Britain | Nov. 29, 1950 |